US012760806B2

(12) United States Patent
Bonomi

(10) Patent No.: US 12,760,806 B2
(45) Date of Patent: Oct. 13, 2026

(54) THREE-WAY VALVE, PARTICULARLY OF THE TYPE WITH A MODULATING FUNCTION

(71) Applicant: Rubinetterie Bresciane Bonomi SPA, Gussago (IT)

(72) Inventor: Aldo Bonomi, Lumezzane (IT)

(73) Assignee: Rubinetterie Bresciane Bonomi SPA, Gussago (IT)

( * ) Notice: Subject to any disclaimer, the term of this patent is extended or adjusted under 35 U.S.C. 154(b) by 29 days.

(21) Appl. No.: 18/968,006

(22) Filed: Dec. 4, 2024

(65) Prior Publication Data

US 2025/0180131 A1 Jun. 5, 2025

(30) Foreign Application Priority Data

Dec. 5, 2023 (IT) ........................ 102023000025914

(51) Int. Cl.
*F16K 11/087* (2006.01)

(52) U.S. Cl.
CPC ..... *F16K 11/0876* (2013.01); *Y10T 137/9464* (2015.04)

(58) Field of Classification Search
CPC ........ F16K 11/163; F16K 11/165; F16K 3/08; Y10T 137/9464
USPC .......................................................... 137/801
See application file for complete search history.

(56) References Cited

U.S. PATENT DOCUMENTS

| | | |
|---|---|---|
| 5,988,220 A | 11/1999 | Sakaki |
| 2021/0301392 A1 | 9/2021 | Park et al. |

FOREIGN PATENT DOCUMENTS

| | | |
|---|---|---|
| IT | BZ20090047 A1 | 4/2011 |
| SE | 2150908 A1 | 1/2023 |

OTHER PUBLICATIONS

Search Report mailed Jun. 7, 2024 in IT102023000025914 (2 pgs.).
Extended European Search Report mailed Apr. 11, 2025 in EP24212967.4 (10 pgs.).

*Primary Examiner* — Daphne M Barry
(74) *Attorney, Agent, or Firm* — Quicker Law, LLC

(57) ABSTRACT

A three-way valve, particularly of the type with a modulating function, comprising a valve body having a substantially cruciform configuration and forming:

a first inlet;

a second inlet;

an outlet; and a receptacle.

Elements for controlling and/or blocking the flows of the fluids, and elements for activating the flow control and/or blocking elements are furthermore provided and accommodated in the receptacle;

the control and/or blocking elements can be switched by virtue of the activation elements between a first configuration, in which the first inlet and the outlet are completely free and in which the second inlet is completely blocked, and a second configuration, in which the second inlet and the outlet are completely free and in which the first inlet is completely blocked, passing through a plurality of intermediate configurations in which the inlets are partially blocked with the outlet completely free.

10 Claims, 6 Drawing Sheets

THREE-WAY VALVE, PARTICULARLY OF THE TYPE WITH A MODULATING FUNCTION

CROSS-REFERENCE TO RELATED APPLICATION

This application claims priority to and the benefit of Italian Application No. 102023000025914 filed Dec. 5, 2023, the disclosure of which is incorporated herein by this reference in its entirety.

FIELD OF THE INVENTION

The present invention relates to a three-way valve, particularly of the type with a modulating function.

BACKGROUND OF THE INVENTION

In the field of hydraulics, it is known to use three-way globe valves which have the purpose of regulating the flow rate of a first fluid by mixing it with a second fluid in a controlled manner.

Such globe valves of the known type are not free from drawbacks, which include the fact that they are structurally complex, thus expensive, and still are unable to have high accuracy in mixing modulation.

Moreover, because of the way in which they are designed, the flow rate of the second fluid cannot be optimally controlled.

BRIEF SUMMARY OF THE INVENTION

The aim of the present invention is to provide a valve that is alternative to the globe valve of the known type that is capable of obviating the drawbacks of the known type.

Within this aim, an object of the present invention is to provide a valve capable of optimally regulating the flow rate or pressure of a first fluid, optionally mixing it with a second fluid.

Another object of the present invention is to provide a valve that can be easily modulated and is constructively simple.

A further object of the present invention is to provide a valve capable of giving the greatest assurances of reliability, efficiencies and operation.

This aim, as well as these and other objects that will become better apparent hereinafter, are achieved by a three-way valve, particularly of the type with a modulating function, comprising a valve body with a substantially cruciform configuration so as to form:

a first inlet, which is substantially oriented along a first axis that passes through said valve body and is adapted to be connected to a first delivery pipe of a first fluid;

a second inlet, which is oriented substantially along a second axis that passes through said valve body substantially at right angles to said first axis and is adapted to be connected to a second delivery pipe of a second fluid;

an outlet, which is oriented along said first axis in a manner that is opposite with respect to said first inlet and a receptacle, which is formed and extended along said second axis in a manner that is opposite with respect to said second inlet;

means for controlling and/or blocking the flows of said fluids being furthermore comprised and being accommodated internally and substantially centrally to said valve body, and means for activating said flow control and/or blocking means being furthermore comprised and accommodated in said receptacle;

characterized in that said control and/or blocking means can be switched by virtue of said activation means between a first configuration, in which said first inlet and said outlet are completely free and in which said second inlet is completely blocked, and a second configuration, in which said second inlet and said outlet are completely free and in which said first inlet is completely blocked, passing through a plurality of intermediate configurations in which said inlets are partially blocked with said outlet completely free.

BRIEF DESCRIPTION OF THE DRAWINGS

Further characteristics and advantages of the invention will become better apparent from the description of a preferred, but not exclusive, embodiment of a three-way valve, particularly of the type with a modulating function, illustrated by way of non-limiting example with the aid of the accompanying drawings, wherein.

DETAILED DESCRIPTION OF THE INVENTION

Figure 1:
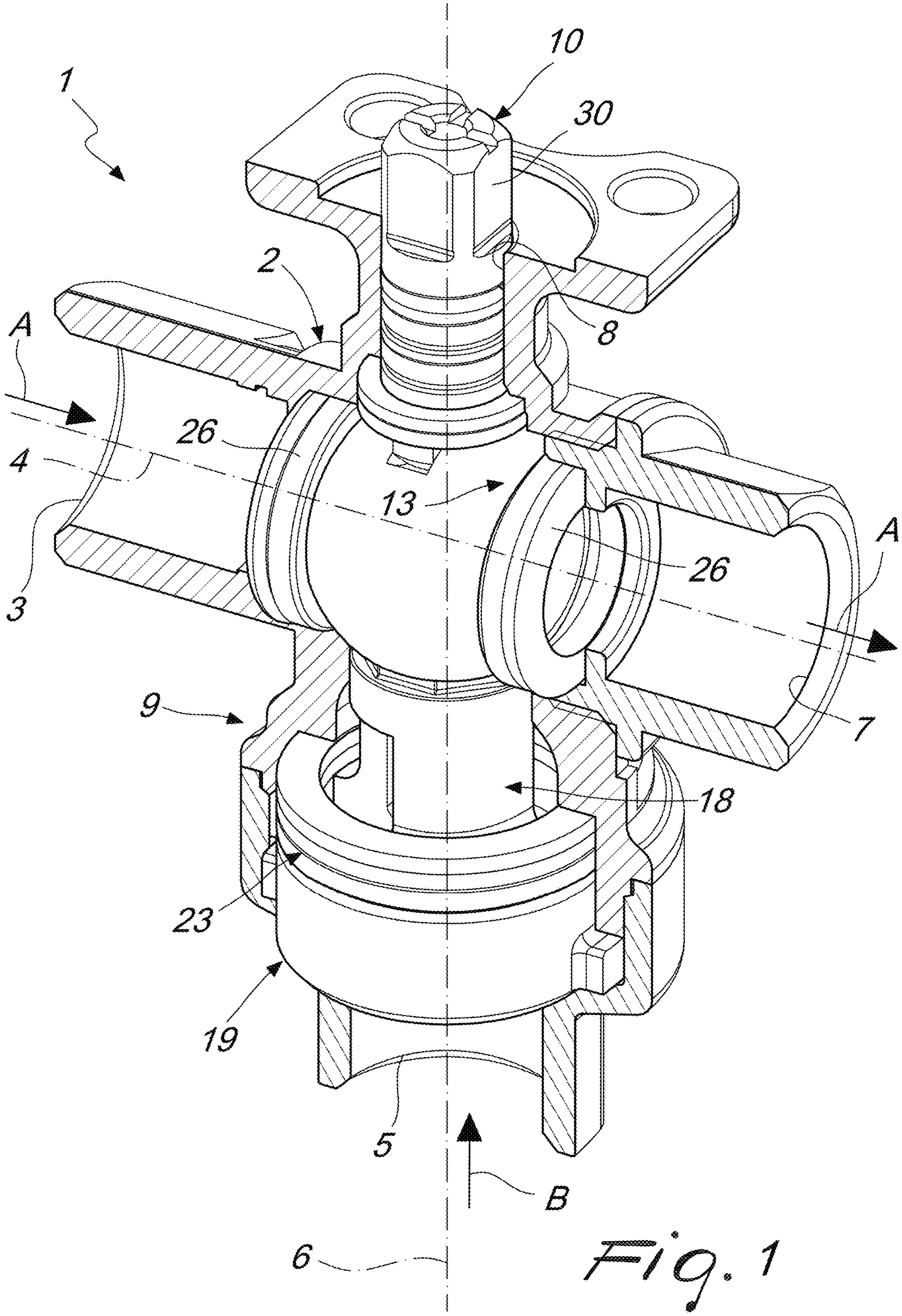
FIG. 1 is a partially sectional perspective view of the valve according to the invention.
Figure 2:
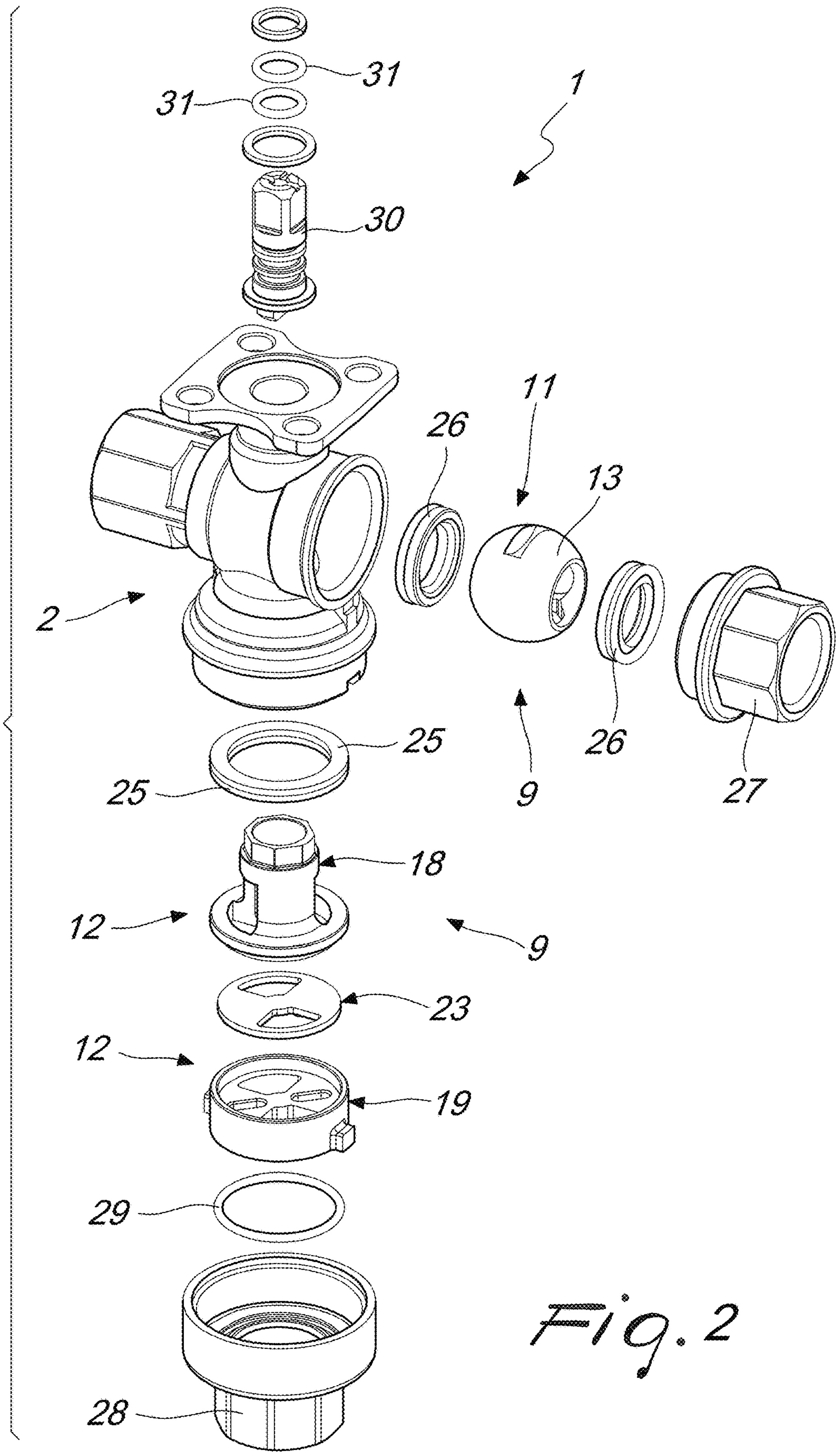
FIG. 2 is an exploded perspective view of the valve shown in FIG. 1.

With reference to the figures, the three-way valve, particularly of the type with a modulating function, generally designated by the reference numeral 1, comprises a valve body 2 having a substantially cruciform configuration so as to form:

a first inlet 3, which is oriented substantially along a first axis 4 that passes through the valve body 2 and is adapted to be connected to a first delivery pipe of a first fluid “A”;

a second inlet 5, which is oriented substantially along a second axis 6 that passes through the valve body 2 substantially at right angles to the first axis 4 and is adapted to be connected to a second delivery pipe of a second fluid “B”;

an outlet 7, which is oriented along the first axis 4 in a manner that is opposite with respect to the first inlet 3 and a receptacle 8, which is formed and extended along the second axis 6 in a manner that is opposite with respect to the second inlet 5.

To complete the valve 1 there are furthermore means 9 for controlling and/or blocking the flows of the fluids “A” and “B” which are accommodated internally and substantially centrally to the valve body 2, and means 10 for activating the flow control and/or blocking means 9, accommodated in the receptacle 8.

Figure 4:
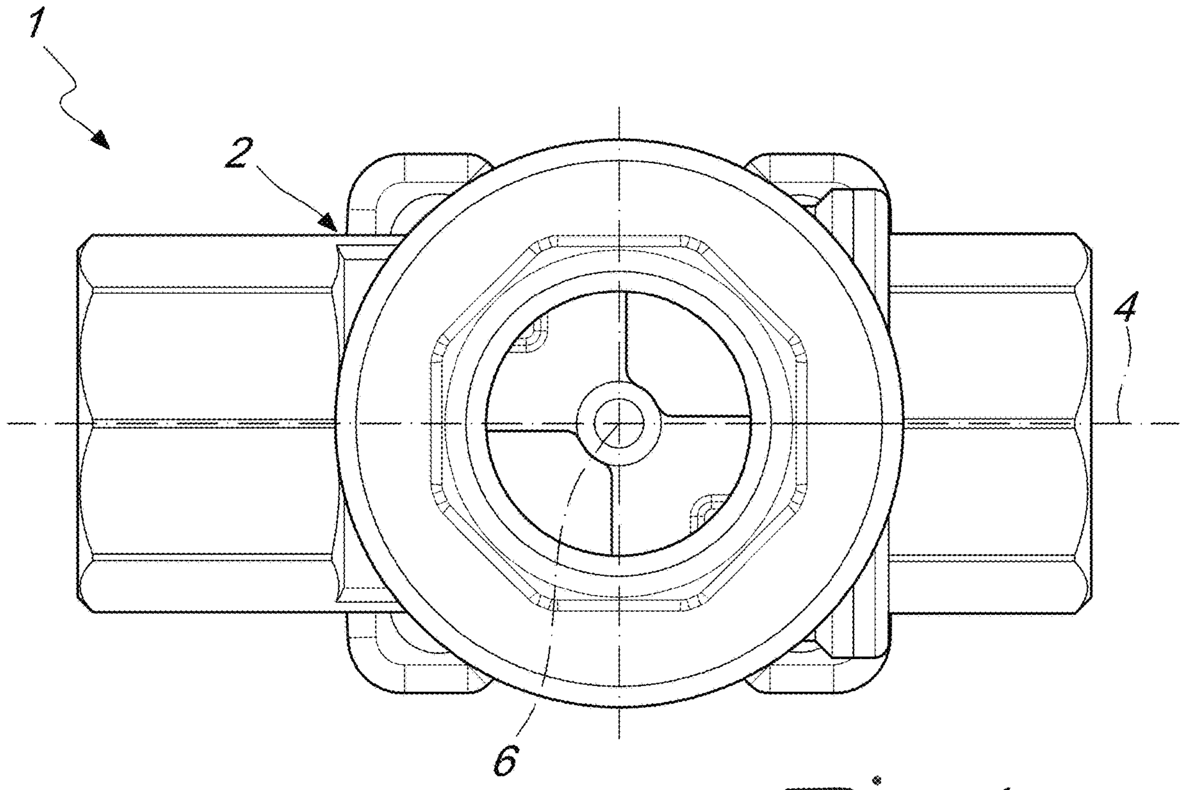
FIGS. 4 and 5 are, respectively, a plan view from below and a sectional view of the valve shown in the preceding figures in its first configuration.
Figure 5:
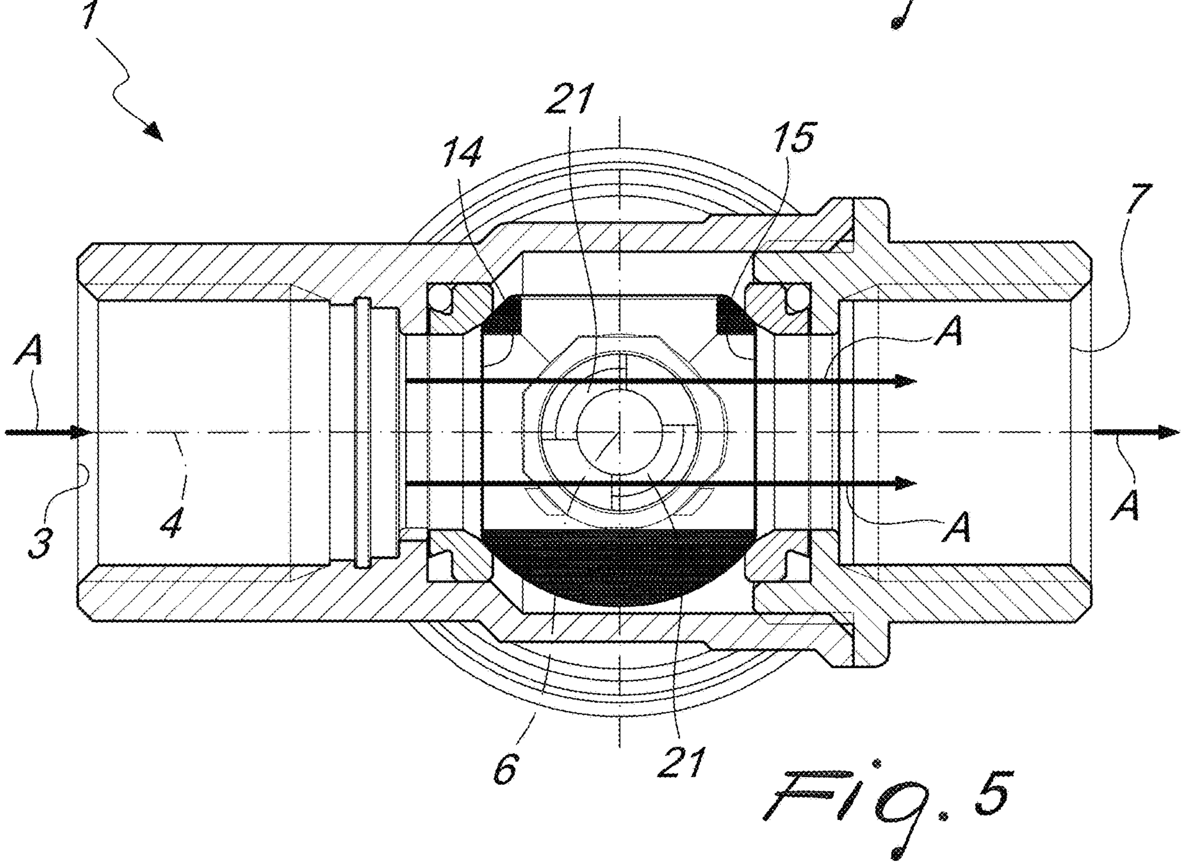
Figure 6:
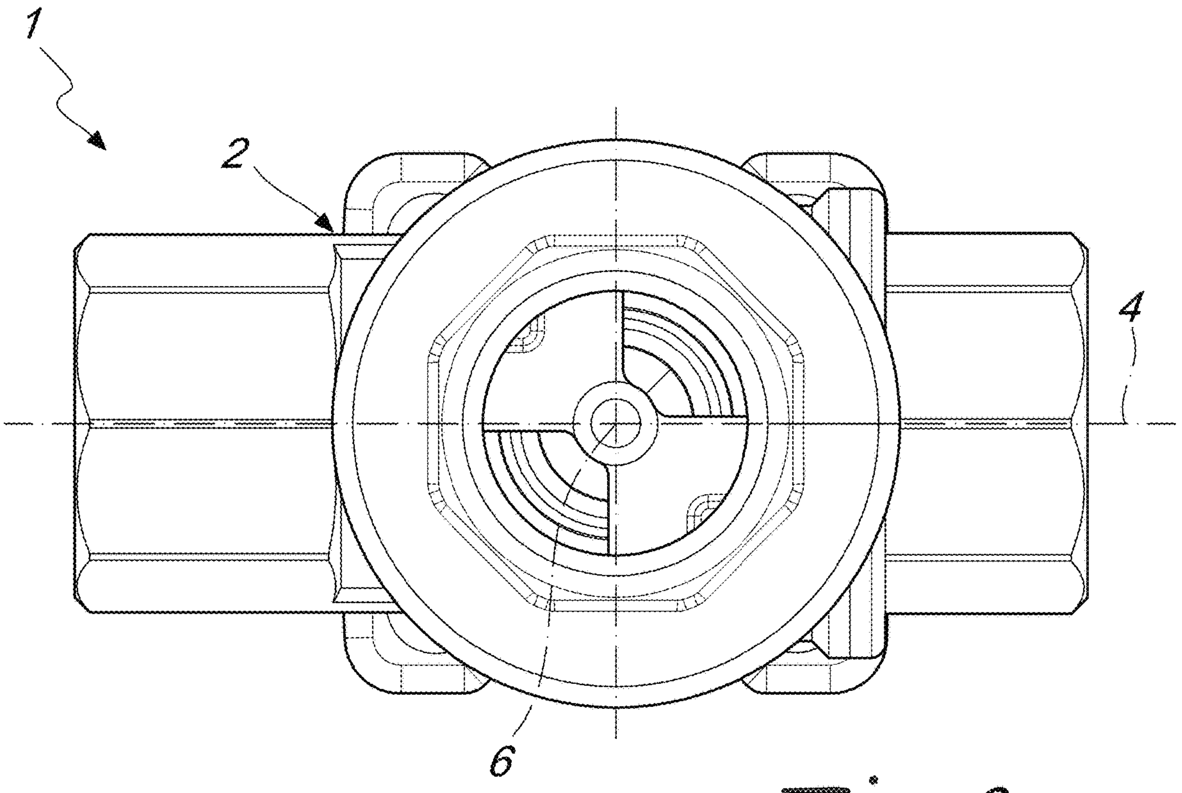
FIGS. 6 and 7 are, respectively, a plan view from below and a sectional view of the valve shown in the preceding figures in its second configuration.
Figure 7:
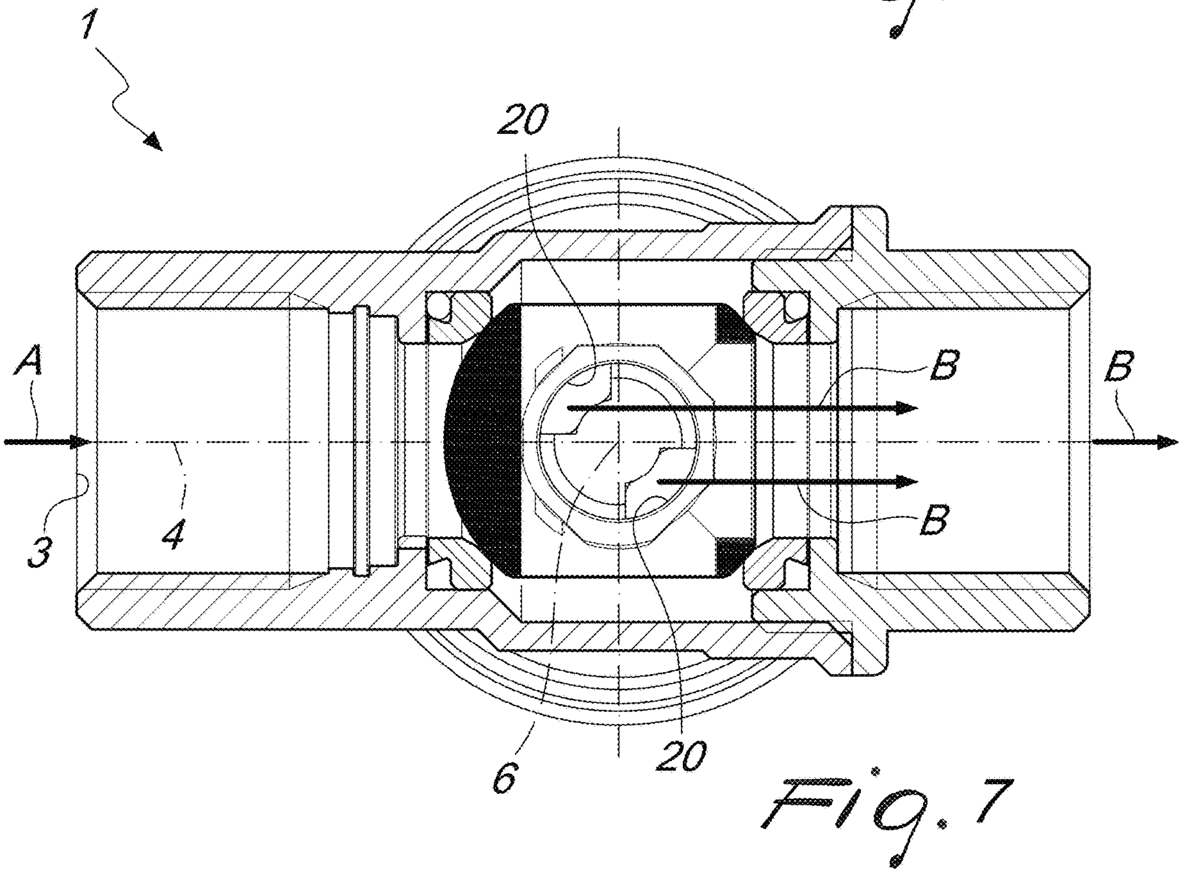
Figure 8:
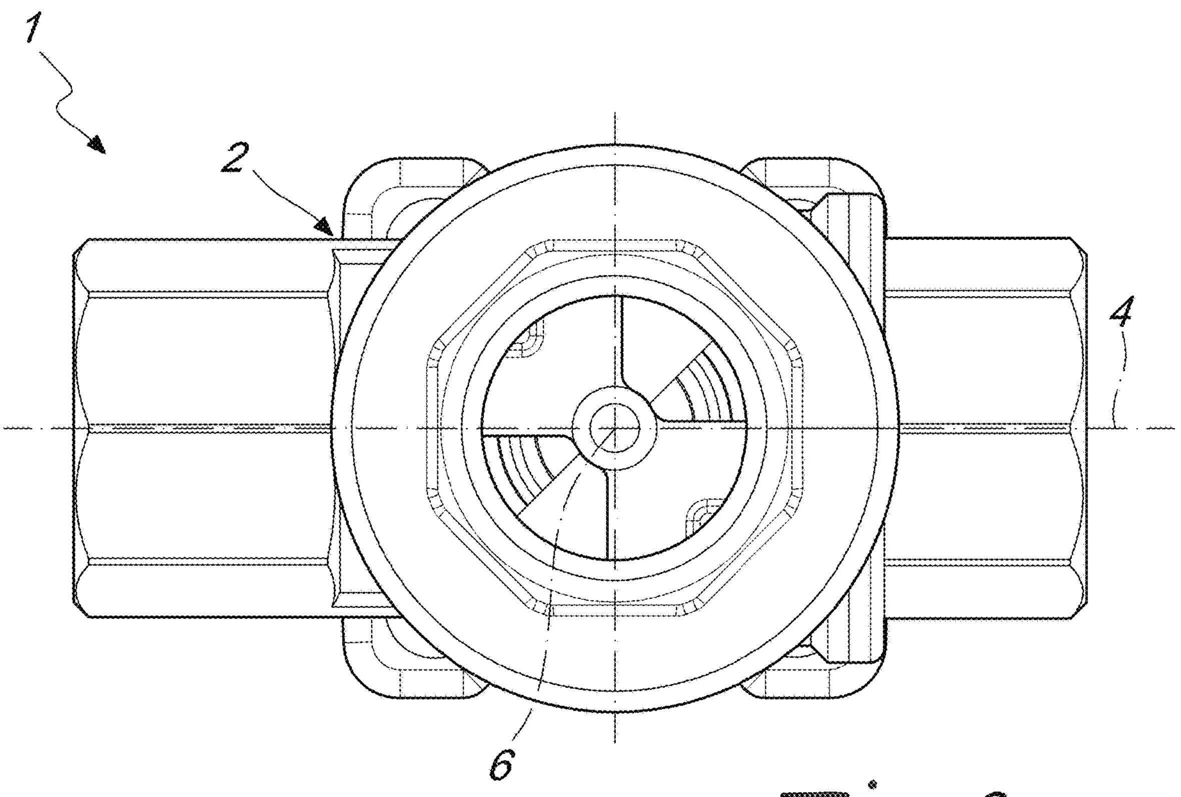
FIGS. 8 and 9 are, respectively, a plan view from below and a sectional view of the valve shown in the preceding figures in a configuration which is intermediate between the previous configurations shown.
Figure 9:
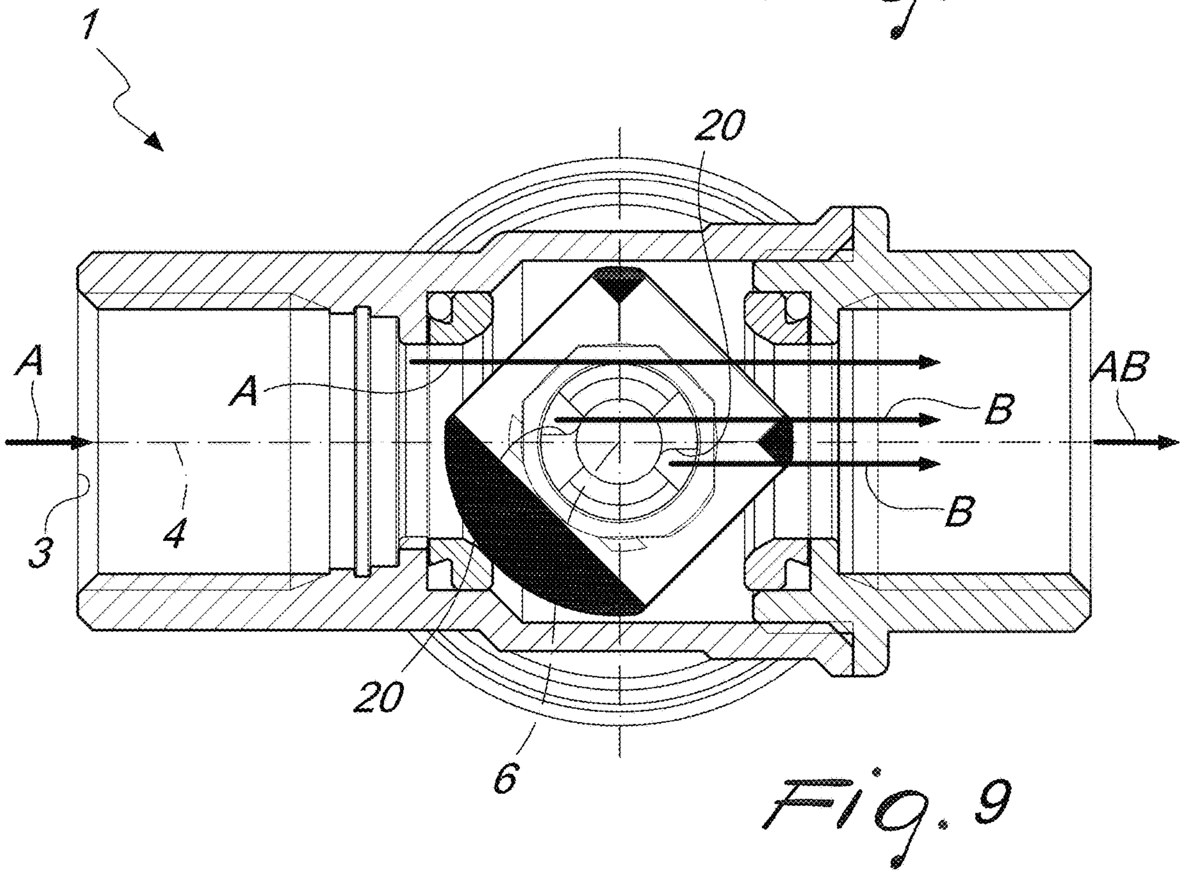

According to the invention, the control and/or blocking means 9 can be switched by virtue of the activation means 10 between a first configuration, shown in FIGS. 4 and 5, and a second configuration, shown in FIGS. 6 and 7, passing through a plurality of intermediate configurations, such as the one shown in FIGS. 8 and 9, in which the inlets 3 and 5 are partially blocked with the outlet 7 completely free.

As will be better described hereinafter, in the first configuration the first inlet 3 and the outlet 7 are completely free, with the second inlet 5 completely blocked.

Conversely, in the second configuration the second inlet 6 and the outlet 7 are completely free with the first inlet 3 completely blocked.

Advantageously, in the proposed embodiment the flow control and/or blocking means 9 comprise:

- a first flow control element 11, which is movable gradually and continuously by means of the actuation of the activation means 10 so as to affect the flow of the first fluid "A" that arrives from the first inlet 3;
- a second flow control element 12, which is movable gradually and continuously by means of the actuation of the activation means 10 so as to affect the flow of the second fluid "B" that arrives from the second inlet 5.

More specifically, the first flow control element 11 is directly associated with the activation means 10 and the second flow control element 12 is associated with the activation means 10 by means of the first flow control element 11.

Figure 3:
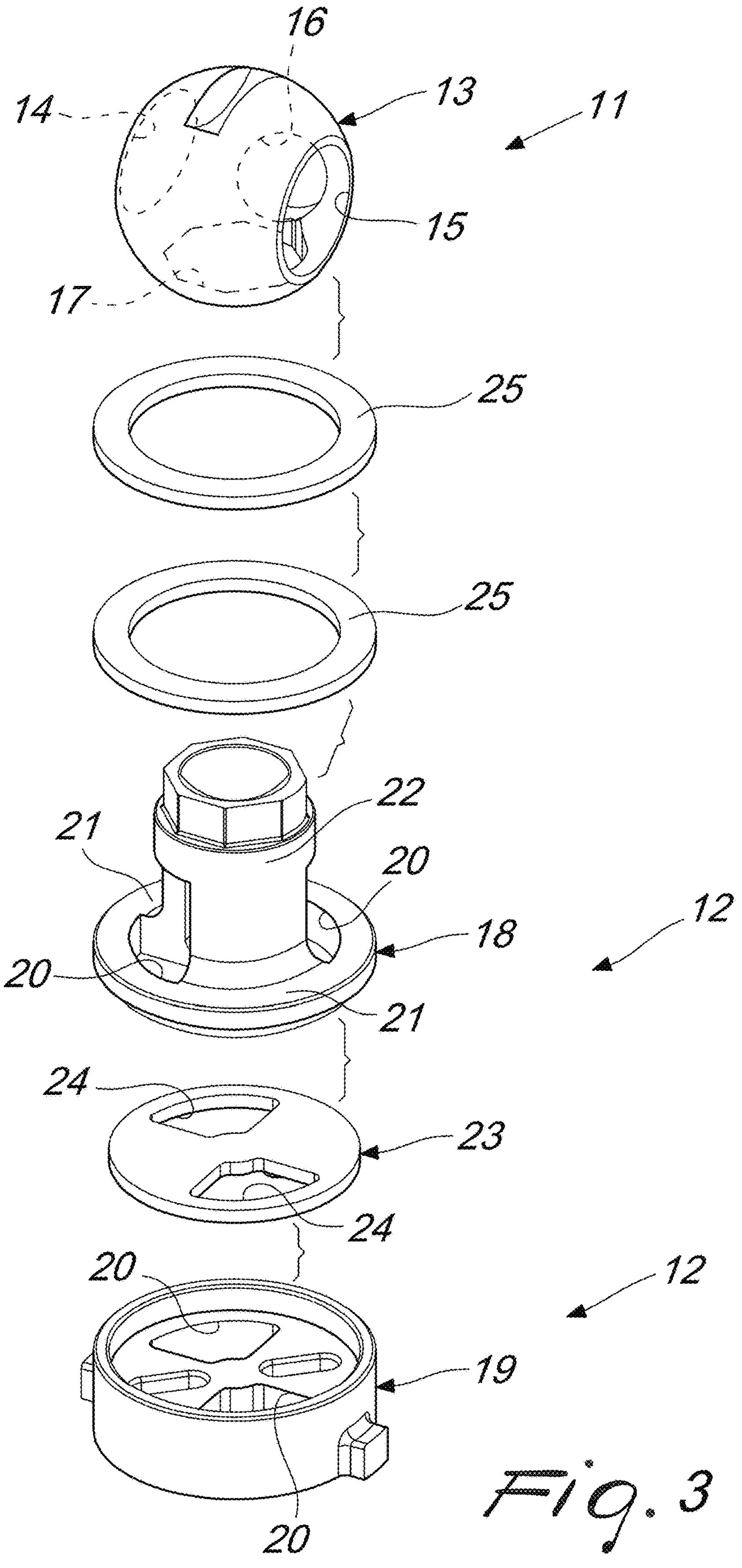
FIG. 3 is an exploded perspective view of only the flow control and/or blocking means of the valve shown in the preceding figures.

With reference to FIG. 3, the first flow control element 11 comprises a hollow sphere 13 which is rotatably and centrally accommodated in the valve body 2 at the intersection of the axes 4 and 6.

Such hollow sphere 13 is directly associated with the activation means 10 for its rotation about the second axis 6 by virtue of a first shape mating and has three openings 14, 15 and 16 formed on planes which are parallel to the second axis 6, two of which are mutually opposite and a third of which is perpendicular to two other ones, so as to connect the first inlet 3 to the outlet 7, in the first configuration, and completely obstruct the first inlet 3, with the only blind side, leaving its interior in communication with the outlet 7, in the second configuration, as a result of a substantially 90° rotation thereof about the second axis 6 with respect to the first configuration.

Advantageously, the hollow sphere 13 has a fourth opening 17 formed oppositely with respect to the activation means 10 at right angles to the second axis 6 in the direction of the second inlet 5.

Again with particular reference to FIG. 3, the second flow control element 12 comprises:

- a movable part, which is constituted by a first perforated disk 18 transversely arranged with respect to the second inlet 5 at right angles to the second axis 6 and is integral with the hollow sphere 13 in rotation, and
- a fixed part, which is constituted by a second perforated disk 19 which is adjacent to the first perforated disk 18, is arranged transversely with respect to the second inlet 5 at right angles to the second axis 6, and is integral with the valve body 2.

In greater detail, each perforated disk 18 and 19 has petal-like passage openings 20 and solid portions 21 which are mutually complementary, with the first perforated disk 18 being movable with respect to the second perforated disk 19 from a position that corresponds to the first configuration, in which the passage openings 20 of the second perforated disk 19 are obstructed by the solid portions 21 of the first perforated disk 18, to another position that corresponds to the second configuration, in which the passage openings 20 of the perforated disks 18 and 19 are mutually aligned for the passage of the second fluid "B" through the second flow control element 12.

Conveniently, the first perforated disk 18 has a hollow tang 22 for connection to the hollow sphere 13, by means of a shape mating with the fourth opening 17, and communicates with the passage openings 20 so as to allow the flow of the second fluid "B" that arrives from the second inlet 5 into the hollow sphere 13 as a result of the alignment of the passage openings 20 of the perforated discs 18 and 19, in said second configuration, or as a result of the partial alignment of the passage openings 20 of the perforated disks 18 and 19, in one of the intermediate configurations.

In order to ensure an adequate hermetic seal, a contoured gasket 23 is interposed between the perforated disks 18 and 19, also has similar passage openings 24 and is integral at least in rotation with the second perforated disk 19.

In order to allow the free rotation of the second flow control element 12 with respect to the valve body 2, a pair of anti-friction disks 25 is fitted on the hollow connecting tang 22 and interposed between the first perforated disk 18 and the valve body 2.

Likewise, in order to allow the free rotation of the first flow control element 11 with respect to the valve body 2, there are two centering bushings 26 accommodated at the first inlet 3 and at the outlet 7, respectively, so as to be interposed between the hollow ball 13 and the valve body 2.

Conveniently, the valve body 2 comprises a first shut-off fitting 27 of the type that is removable by means of a threaded coupling, at the outlet 7, so as to allow the hollow sphere 13 and the centering bushings 27 to be inserted in the valve body 2.

Equally conveniently, the valve body 2 comprises a second shut-off fitting 28 of the type that is removable by means of a threaded coupling and is provided with an O-ring 29, at the second inlet 5, so as to allow the insertion of the anti-friction disks 25, of the perforated disks 18 and 19, and of the contoured gasket 23 in the valve body 2.

Finally, the activation means 10 comprise an actuation rod 30 which is fitted on the hollow sphere 13 on the opposite side with respect to the fourth opening 17 by means of a shape mating.

Conveniently, the actuation rod 30 is integral in rotation with the hollow sphere 13 about the second axis 6 and is associable with a control lever or an actuator, and one or more sealing O-rings 31 are provided between the actuation rod 30 and the valve body 2.

The operation of the valve 1 according to the present invention can be easily understood from what has just been described.

In greater detail, with reference to FIGS. 4 and 5, in the first configuration the first fluid "A" can flow through the mutually opposite openings 14 and 15 of the hollow sphere 13 from the first inlet 3 to the outlet 7.

Differently, the second fluid "B" is here completely blocked by the solid portions 21 of the first perforated disk 18, which blocks the passage openings 20 of the second perforated disk 19.

In this case, the fluid that exits from the valve 1 is constituted only by the first fluid "A" with a substantially unchanged flow rate.

With reference to FIGS. 8 and 9, starting from the first configuration and following a clockwise rotation (looking at said figures) of the actuation rod 30, both the hollow sphere 13 and the first perforated disk 18 perform a clockwise rotation, respectively gradually reducing the flow rate of the first fluid "A" and opening, and thus gradually increasing, the flow rate of the second fluid "B".

In this case, the fluid that exits from the valve 1 is constituted by both the first fluid "A" and the second fluid "B" with a percentage that is variable according to the degree of valve opening and with a total flow rate given by the sum of the two flow rates of the two circulating fluids "A" and "B".

With reference to FIGS. 6 and 7, continuing with the rotation of the actuation rod 30 until a rotation substantially equal to 90° is reached, the second configuration is reached.

In this second configuration, the second fluid "B" can flow through the passage openings 20, through the hollow connecting tang 22 and through the hollow sphere 13, passing from the second inlet 5 to the outlet 7 through the third opening 16 of the hollow sphere 13.

Differently, the first fluid "A" is here completely blocked by the solid portion of the hollow sphere 13 that blocks the first inlet 3.

In this case, the fluid that exits from the valve 1 is constituted only by the second fluid "B" with a substantially unchanged flow rate.

In practice it has been found that the three-way valve, according to the present invention, achieves the intended aim and objects, since it is capable of being switched, allowing to vary the flow rate of the two fluids linearly from 0 to 100% in a mutually opposite manner.

The three-way valve thus conceived is susceptible of numerous modifications and variations, all of which are within the scope of the accompanying claims.

All the details may furthermore be replaced with other technically equivalent elements.

In practice, the materials used, so long as they are compatible with the specific use, as well as the contingent shapes and dimensions, may be any according to the requirements and the state of the art.

What is claimed is:

1. A three-way valve, particularly of the type with a modulating function, comprising a valve body having a substantially cruciform configuration so as to form:

a first inlet, which is oriented substantially along a first axis that passes through said valve body and is adapted to be connected to a first delivery pipe of a first fluid;

a second inlet, which is oriented substantially along a second axis that passes through said valve body substantially at right angles to said first axis and is adapted to be connected to a second delivery pipe of a second fluid;

an outlet, which is oriented along said first axis in a manner that is opposite with respect to said first inlet; and a receptacle, which is formed and extended along said second axis in a manner that is opposite with respect to said second inlet;

means for controlling and/or blocking flows of said fluids being furthermore comprised and being accommodated internally and substantially centrally to said valve body, and means for activating said flow control and/or blocking means being furthermore comprised and being accommodated in said receptacle;

wherein said control and/or blocking means are configured to be switched by virtue of said activation means between a first configuration, in which said first inlet and said outlet are completely free and in which said second inlet is completely blocked, and a second configuration, in which said second inlet and said outlet are completely free and in which said first inlet is completely blocked, passing through a plurality of intermediate configurations in which said first and second inlets are partially blocked while said outlet remains completely free, wherein said control and/or blocking means comprise:

a first flow control element, which can move gradually and continuously by means of the actuation of said activation means so as to affect the flow of said first fluid that arrives from said first inlet;

a second flow control element, which can move gradually and continuously by means of the actuation of said activation means so as to affect the flow of said second fluid that arrives from said second inlet;

said first and second flow control elements being distinct elements;

said first flow control element being directly associated with said activation means and said second flow control element being associated with said activation means by virtue of said first flow control element.

2. The valve according to claim 1, wherein said first flow control element comprises a hollow sphere which is accommodated rotatably and centrally in said valve body at an intersection of said first and second axes; said hollow sphere being directly associated with said activation means for rotation thereof about said second axis and having three openings formed on planes which are parallel to said second axis, two openings of said three openings of which are mutually opposite and a third opening of said three openings of which is perpendicular to said mutually opposite openings, so as to put said first inlet in communication with said outlet in said first configuration and so as to completely block said first inlet, leaving an interior of said hollow sphere in communication with said outlet in said second configuration as a result of a rotation thereof substantially through 90° about said second axis with respect to said first configuration; said hollow sphere having a fourth opening formed on an opposite side with respect to said activation means at right angles to said second axis in a direction of said second inlet.

3. The valve according to claim 2, wherein said activation means comprise an actuation rod which is engaged in said hollow sphere on an opposite side with respect to said fourth opening; said actuation rod being integral in rotation with respect to said hollow sphere about said first axis and being associable with a control lever or an actuator.

4. The valve according to claim 2, wherein said second flow control element comprises:

a first perforated disk, which is arranged transversely with respect to said second inlet at right angles to said second axis and is integral in rotation with said hollow sphere, and a second perforated disk, which is adjacent to said first perforated disk, is arranged transversely with respect to said second inlet at right angles to said second axis and is integral with said valve body;

each one of said perforated disks having passage openings and solid portions which are mutually complementary; said first perforated disk being movable with respect to said second perforated disk from a position that corresponds to said first configuration, in which said passage openings of said second perforated disk are blocked by said solid portions of said first perforated disk, to another position that corresponds to said second configuration, wherein said passage openings of said perforated disks are aligned with each other for the passage of said second fluid through said second flow control element; said first perforated disk having a hollow tang for connection to said hollow sphere and communicating with said passage openings so as to allow the flow of said second fluid that arrives from said second inlet within said hollow sphere as a result of the alignment of said passage openings of said perforated disks, in said second configuration, or as a result of the partial alignment of said passage openings of said perforated disks, in one of said intermediate configurations.

5. The valve according to claim 4, further comprising a contoured gasket which is interposed between said perforated disks and also has similar passage openings and is integral at least in rotation with said second perforated disk.

6. The valve according to claim 5, further comprising a pair of anti-friction disks fitted on said hollow connecting tang and interposed between said first perforated disk and said valve body.

7. The valve according to claim 6, wherein said valve body comprises a second shut-off fitting of removable type, at said second inlet so as to allow insertion of said anti-friction disks, said perforated disks and said contoured gasket in said valve body.

8. The valve according to claim 1, further comprising two centering bushings accommodated at said first inlet and at said outlet, respectively, so as to be interposed between said hollow sphere and said valve body.

9. The valve according to claim 8, wherein said valve body comprises a first shut-off fitting of removable type, at said outlet, so as to allow insertion of said hollow sphere and of said centering bushings in said valve body.

10. A three-way valve, particularly of the type with a modulating function, comprising a valve body having a substantially cruciform configuration so as to form:

a first inlet, which is oriented substantially along a first axis that passes through said valve body and is adapted to be connected to a first delivery pipe of a first fluid;

a second inlet, which is oriented substantially along a second axis that passes through said valve body substantially at right angles to said first axis and is adapted to be connected to a second delivery pipe of a second fluid;

an outlet, which is oriented along said first axis in a manner that is opposite with respect to said first inlet; and a receptacle, which is formed and extended along said second axis in a manner that is opposite with respect to said second inlet;

means for controlling and/or blocking flows of said fluids being furthermore comprised and being accommodated internally and substantially centrally to said valve body, and means for activating said flow control and/or blocking means being furthermore comprised and being accommodated in said receptacle;

wherein said control and/or blocking means are configured to be switched by virtue of said activation means between a first configuration, in which said first inlet and said outlet are completely free and in which said second inlet is completely blocked, and a second configuration, in which said second inlet and said outlet are completely free and in which said first inlet is completely blocked, passing through a plurality of intermediate configurations in which said inlets are partially blocked while said outlet remains completely free, wherein said first flow control element comprises a hollow sphere which is accommodated rotatably and centrally in said valve body at an intersection of said axes; said hollow sphere being directly associated with said activation means for rotation thereof about said second axis and having three openings formed on planes which are parallel to said second axis, two of which are mutually opposite and a third of which is perpendicular to said mutually opposite openings, so as to put said first inlet in communication with said outlet in said first configuration and so as to completely block said first inlet, leaving an interior of said hollow sphere in communication with said outlet in said second configuration as a result of a rotation thereof substantially through 90° about said second axis with respect to said first configuration; said hollow sphere having a fourth opening formed on an opposite side with respect to said activation means at right angles to said second axis in a direction of said second inlet, wherein said second flow control element comprises:

a first perforated disk, which is arranged transversely with respect to said second inlet at right angles to said second axis and is integral in rotation with said hollow sphere, and a second perforated disk, which is adjacent to said first perforated disk, is arranged transversely with respect to said second inlet at right angles to said second axis and is integral with said valve body;

each one of said perforated disks having passage openings and solid portions which are mutually complementary; said first perforated disk being movable with respect to said second perforated disk from a position that corresponds to said first configuration, in which said passage openings of said second perforated disk are blocked by said solid portions of said first perforated disk, to another position that corresponds to said second configuration, wherein said passage openings of said perforated disks are aligned with each other for the passage of said second fluid through said second flow control element; said first perforated disk having a hollow tang for connection to said hollow sphere and communicating with said passage openings so as to allow the flow of said second fluid that arrives from said second inlet within said hollow sphere as a result of the alignment of said passage openings of said perforated disks, in said second configuration, or as a result of the partial alignment of said passage openings of said perforated disks, in one of said intermediate configurations.

* * * * *